US007792780B2

(12) United States Patent
Zhou et al.

(10) Patent No.: US 7,792,780 B2
(45) Date of Patent: Sep. 7, 2010

(54) UPDATING AN ENGINE USING A DESCRIPTION LANGUAGE

(75) Inventors: Long Zhou, Renton, WA (US); Andrew K. Glover, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 504 days.

(21) Appl. No.: 11/846,258

(22) Filed: Aug. 28, 2007

(65) Prior Publication Data

US 2009/0063391 A1 Mar. 5, 2009

(51) Int. Cl.
*G06F 17/00* (2006.01)
(52) U.S. Cl. ....................................... 706/59
(58) Field of Classification Search .................... 706/59
See application file for complete search history.

(56) References Cited

U.S. PATENT DOCUMENTS

| | | | | |
|---|---|---|---|---|
| 5,157,595 | A * | 10/1992 | Lovrenich | 700/7 |
| 5,568,269 | A * | 10/1996 | Jamzadeh | 358/3.07 |
| 5,592,654 | A * | 1/1997 | Djakovic | 710/8 |
| 6,161,130 | A | 12/2000 | Horvitz et al. | |
| 6,532,455 | B1 | 3/2003 | Martin et al. | |
| 6,769,016 | B2 | 7/2004 | Rothwell et al. | |
| 7,194,445 | B2 * | 3/2007 | Chan et al. | 706/20 |
| 7,298,503 | B2 * | 11/2007 | Christiansen et al. | 358/1.13 |
| 2002/0147726 | A1 | 10/2002 | Yehia et al. | |
| 2003/0065755 | A1 | 4/2003 | Gunji et al. | |
| 2003/0191969 | A1 | 10/2003 | Katsikas | |
| 2006/0036656 | A1 | 2/2006 | Mercer | |
| 2006/0075052 | A1 | 4/2006 | Oostendorp | |
| 2007/0005657 | A1 | 1/2007 | Bohannon et al. | |

FOREIGN PATENT DOCUMENTS

WO  WO2005033934  4/2005

OTHER PUBLICATIONS

Design of a Rule Based System Using Structured Query Language, Abdullah, U.; Sawar, M.J.; Ahmed, A.; Dependable, Autonomic and Secure Computing, 2009. DASC '09. Eighth IEEE International Conference on Digital Object Identifier: 10.1109/DASC.2009.78 Publication Year: 2009, pp. 223-228.*

Natural Language SOA Using Dynamic Logic, Perlovsky, L.I.; Integration of Knowledge Intensive Multi-Agent Systems, 2007. KIMAS 2007. International Conference on Digital Object Identifier: 10.1109/KIMAS.2007.369785 Publication Year: 2007, pp. 58-62.*

(Continued)

*Primary Examiner*—Michael Holmes
(74) *Attorney, Agent, or Firm*—Lee & Hayes, PLLC

(57) ABSTRACT

Functionality is described for sending updated engine logic to a user device. The engine logic is expressed in a description language, such as the extensible markup language (XML). The user device uses the updated engine logic to update a parse tree. The user device then uses the parse tree to process various events. By virtue of the formation of the engine logic in a description language, a network-accessible service can disseminate the engine in an efficient manner. In one illustrative application, the user device can use the parse tree to process electronic messages (e.g., Email messages) that have been received by the user device.

20 Claims, 9 Drawing Sheets

OTHER PUBLICATIONS

Quixote as a tool for natural language processing, Tojo, S.; Tsuda, H.; Yasukawa, H.; Yokota, K.; Morita, Y.; Tools with Artificial Intelligence, 1993. TAI '93. Proceedings., Fifth International Conference on Digital Object Identifier: 10.1109/TAI.1993.633966 Publication Year: 1993 , pp. 266-270.*

An Adaptive XML Parser for Developing High-Performance Web Services, Wei Zhang; van Engelen, R.; eScience, 2008. eScience '08. IEEE Fourth International Conference on Digital Object Identifier: 10.1109/eScience.2008.87 Publication Year: 2008 , pp. 672-679.*

Bonifati, et al., "Active rules for XML: A new paradigm for E-services," The VLDB Journal, vol. 10, 2001, available at <<http://dns2.icar.cnr.it/angela/pubs/vldbJournal.pdf>>, pp. 39-47.

Rekouts, "Incorporating active rules processing into update execution in XML database systems," Proceedings of the 16th International Workshop on Database and Expert Systems Applications (DEXA'05), 2005, available at <<http://ieeexplore.ieee.org/iel5/10080/32313/01508375.pdf?isNumber=>>, 6 pages.

"Deploying Firefox 2 within the Enterprise: Part 5," Mike's Musing, available at <<http://www.kaply.com/weblog/2007/03/26/deploying-firefox-2-within-the-enterprise-part-5/>>, accessed on May 28, 2007, 4 pages.

"Microsoft Unveils Diagnostic Tool for End-to-End Health Checks in Exchange Server Deployments," Microsoft PressPass—Information for Journalists, Sep. 22, 2004, available at <<http://www.microsoft.com/presspass/features/2004/sep04/09-22exchangeanalyzer.mspx>>, accessed on May 28, 2007, 2 pages.

* cited by examiner

```
<RuleSet name="BlockSender" execution="list">

<UserDefinedConditions>
      <UserDefinedCondition id="BlockDomainDetermination">
        <And>
          <AddrsWithSameDomainExistInList>
            <header>From</header>
            <list>BlockList</list>
          </AddrsWithSameDomainExistInList>
          <AddrsWithSameDomainExistInList not="true">
            <header>From</header>
            <list>ContactList</list>
          </AddrsWithSameDomainExistInList>
        </And>
      </UserDefinedCondition>
      ...
    </UserDefinedConditions>
```
406

```
    <Rule name="BlockSenderRule">
      <If>
        <And>
          <MessageInFolder not="true">
            <folder>00000000-0000-0000-0000-000000000005</folder>
          </MessageInFolder>
          <Or>
            <HeaderValueEqualsUserEmail not="true">
              <header>From</header>
            </HeaderValueEqualsUserEmail>
            <UserDefinedCondition
              not="true">BlockDomainDetermination</UserDefinedCondition>
          </Or>
        </And>
      </If>
```
402

```
      <Execute>
        <AddHeaderValueToList>
          <header>From</header>
          <list>BlockList</list>
        </AddHeaderValueToList>
        <SetParameter>BounceMessage</SetParameter>
      </Execute>
    </Rule>
        ...
```
404

```
</RuleSet>
```

FIG. 4

UPDATING AN ENGINE USING A DESCRIPTION LANGUAGE

BACKGROUND

A network-accessible service can update a program provided by a user device by periodically sending code to the user device. The code may represent a current version of the program. Or the code may represent a patch that the user device can use to update the program in piecemeal fashion. In either case, the code can take the form of executable content.

The above approach may have various shortcomings. For instance, it may require a significant amount of time and/or bandwidth to update the user device using executable content. To address this issue; an administrator of the network-accessible service may decrease the frequency at which updates are sent to the user device. This solution, however, is not optimal. Viruses and other types of malicious threats may rapidly evolve. Reducing the frequency at which the user device is kept abreast of code changes may fail to counter new threats in a timely manner, thus exposing the user device to such types of threats.

SUMMARY

According to one illustrative implementation, functionality is described for sending updated engine logic to a user device. The engine logic is expressed in a description language, such as the extensible markup language (XML). The user device uses the updated engine logic to update a parse tree. The user device then uses the parse tree to process various events. By virtue of the formation of the engine logic in a description language, a network-accessible service can disseminate the engine logic in an efficient manner.

According to one illustrative feature, the engine logic comprises at least one rule set. The rule set can include a plurality of rules. Each rule includes a condition portion and an executable portion. The condition portion describes a conditional function that defines whether the rule is applicable. The executable portion describes at least one action to be performed if the rule is applicable.

According to another illustrative feature, the user device can execute the rules in the rule set in one of two modes. In a list mode of processing, the user device executes all of the rules in the rule set. In an IF-ELSE mode of processing, the user device processes the rules in the rule set until it encounters an applicable rule, upon which it executes one or more actions associated with the rule and then terminates.

According to one illustrative application, the user device can use the parse tree to process electronic messages (e.g., Email messages) that have been received by the user device. The processing may entail assessing the level of safety of the electronic messages and performing appropriate actions on the electronic messages.

Additional illustrative features and applications are described in the following Detail Description section.

BRIEF DESCRIPTION OF THE DRAWINGS

FIG. 4 shows a sample of an illustrative rule set.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for sending updated engine logic to a user device in an efficient manner by expressing the engine logic using a description language (rather than executable binary form). The approach can be implemented by various systems, apparatuses, modules, methods, computer-readable media, data structures, and other forms.

This disclosure includes the following sections. Section A describes an illustrative system for updating a user device. Section B describes illustrative procedures that explain the operation of the system of Section A.

A. Illustrative System

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

A.1. Overview of System

Figure 1:
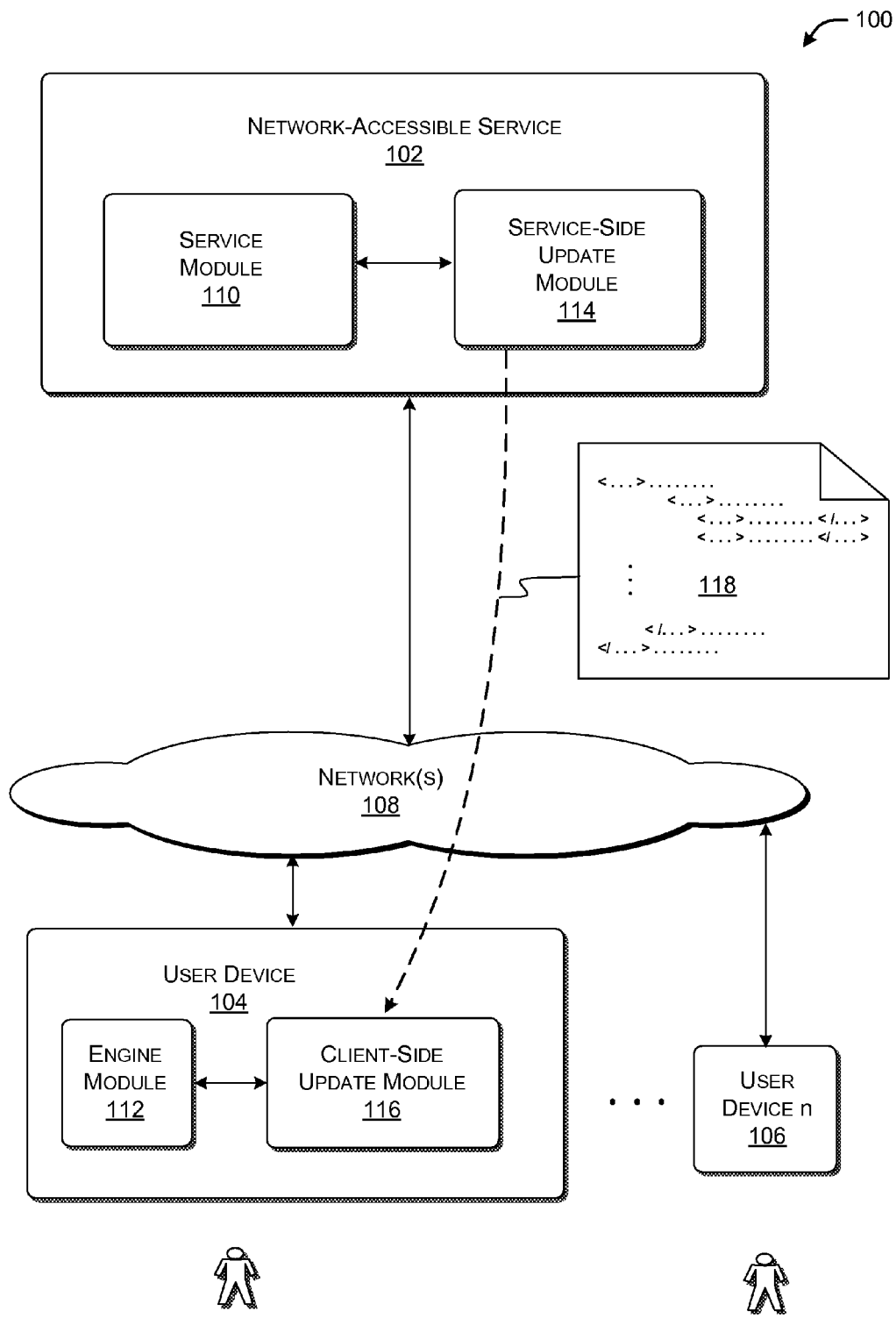
FIG. 1 shows an illustrative system for sending engine logic from a network-accessible service to at least one user device.

FIG. 1 shows an overview of a system 100 for sending updated engine logic from a network-accessible service 102 to a plurality of user devices. FIG. 1 shows two representative user devices (104, 106). The engine logic is used by the user devices (104, 106) to perform a function. According to one application, the engine logic allows a user device to process electronic messages (e.g., Email messages). The processing entails assessing the level of safety of incoming messages and taking appropriate actions on the messages. While the message-related application is featured as a prominent example herein, the system 100 can be applied to other applications and environments.

The network-accessible service 102 corresponds to any data processing equipment for providing any type of service.

For instance, the network-accessible service 102 can include one or more server-type computers, data stores, and so on. The equipment in the network-accessible service 102 can be located at a single site or distributed over plural sites. Each user device (104, 106) can correspond to any kind of electronic processing device, such as a personal computer, a laptop computer, a personal digital assistant (PDA), a game console device, a set-top box associated with a television unit, and so forth.

The network-accessible service 102 can interact with the user devices (104, 106) via a network 108. The network 108 can represent a local area network (LAN), a wide area network (WAN) (e.g., the Internet), or some combination of LAN(s) and WAN(s). The network 108 can be implemented by any combination of wireless links, hardwired links, routers, gateways, name servers, and so forth (not shown), and can be governed by any protocol or combination of protocols.

The network-accessible service 102 includes a service module 110. The service module 110 provides various functions associated with whatever service is made available to user devices (104, 106) by the network-accessible service 102. Each user device (104, 106) includes a respective engine module. For instance, consider representative user device 104, which includes an engine module 112. The engine module 112 provides various functions that complement the functions provided by the service module 110.

In the case of an electronic message application, the service module 110 and the engine module 112 cooperate to transmit and receive electronic messages. These modules (110, 112) also include safety-related functionality for cooperatively identifying and ameliorating security threats. More specifically, the engine module 112 can maintain security-related information (e.g., address lists, etc.) used to identify and filter out potentially inappropriate electronic messages. When a new electronic message is received, the client-side engine module 112 can consult the security-related information to assess the security level of the electronic message and take appropriate action based thereon and based on the instructions of the user. The service module 110 can also maintain a duplicate copy of the security-related information. The service module 110 and the engine module 112 can periodically synchronize their copies of the security-related information. By maintaining the security-related information at the service module 110, a user can access this information from various devices. Also, in the event that a user device loses its local copy of the security-related information, the service module 110 can be used to restore this information.

The network-accessible service 102 also includes a service-side update module 114 and the representative user device 104 includes a client-side update module 116. The purpose of the service-side update module 114 is to provide a current version of engine logic to the user devices (104, 106). For example, FIG. 1 uses a dashed line to illustrate that the service-side update module 112 is sending updated engine logic to representative user device 104. The purpose of the client-side update module 116 is to interact with the service-side update module 114 to receive the updated engine logic. As will be described below, the engine logic provides various rules which govern the behavior of the engine module 112 as it processes incoming electronic messages.

In one case, the user device 104 has the opportunity to receive updated engine logic each time it communicates with the network-accessible service 102. The network-accessible service 102 can provide updated engine logic to the user device 104 using a push technique (in which the network-accessible service 102 initiates downloading of the engine logic), a pull technique (in which the network-accessible service 102 provides the engine logic upon being requested to do so by the user device 104), or a combination of push and pull techniques. In one implementation, for instance, the user device 104 can initiate downloading of updated engine logic each time it communicates with the network-accessible service 102. In another case, the network-accessible service 102 can periodically send updated engine logic to the user device 104. Additional details regarding the downloading process are provided below, e.g., in connection with FIG. 7.

FIG. 1 shows a graphical representation of the engine logic 118. The engine logic 118 is expressed in a description language. The language is as description language in the sense that it describes (or specifies) the logical functions provided by the engine module 112 without providing the executable code which actually implements the logical functions. In one illustrative and non-limiting case, the engine logic 118 can be expressed in a markup language, such as the extensible markup language (XML). The proper formation of the engine logic 118 can be specified by a schema.

Upon receipt of the engine logic 118, the client-side update module 116 applies the updated engine logic 118 to implement an updated parse tree. The updated parse tree represents the logical functions described by the engine logic in memory. The engine module 112 includes generic functionality which, in effect, is configured by the parse tree. The engine module 112 uses the parse tree to process events, e.g., to assess the safety level of electronic messages and perform various actions on the messages.

Since updates to the engine module 112 are expressed in a description language, the system 100 can transmit and implement the engine logic 118 more efficiently and reliably compared to the case of transmitting and processing actual binary executables. For instance, XML engine logic can be transmitted more quickly with less bandwidth compared to transmitting corresponding program code. This enables the network-accessible service 102 to update the engine module 112 on a more frequent basis (compared to the case of transmitting binary executables), better ensuring that the engine module 112 is protected against security threats, such as viruses.

Figure 2:
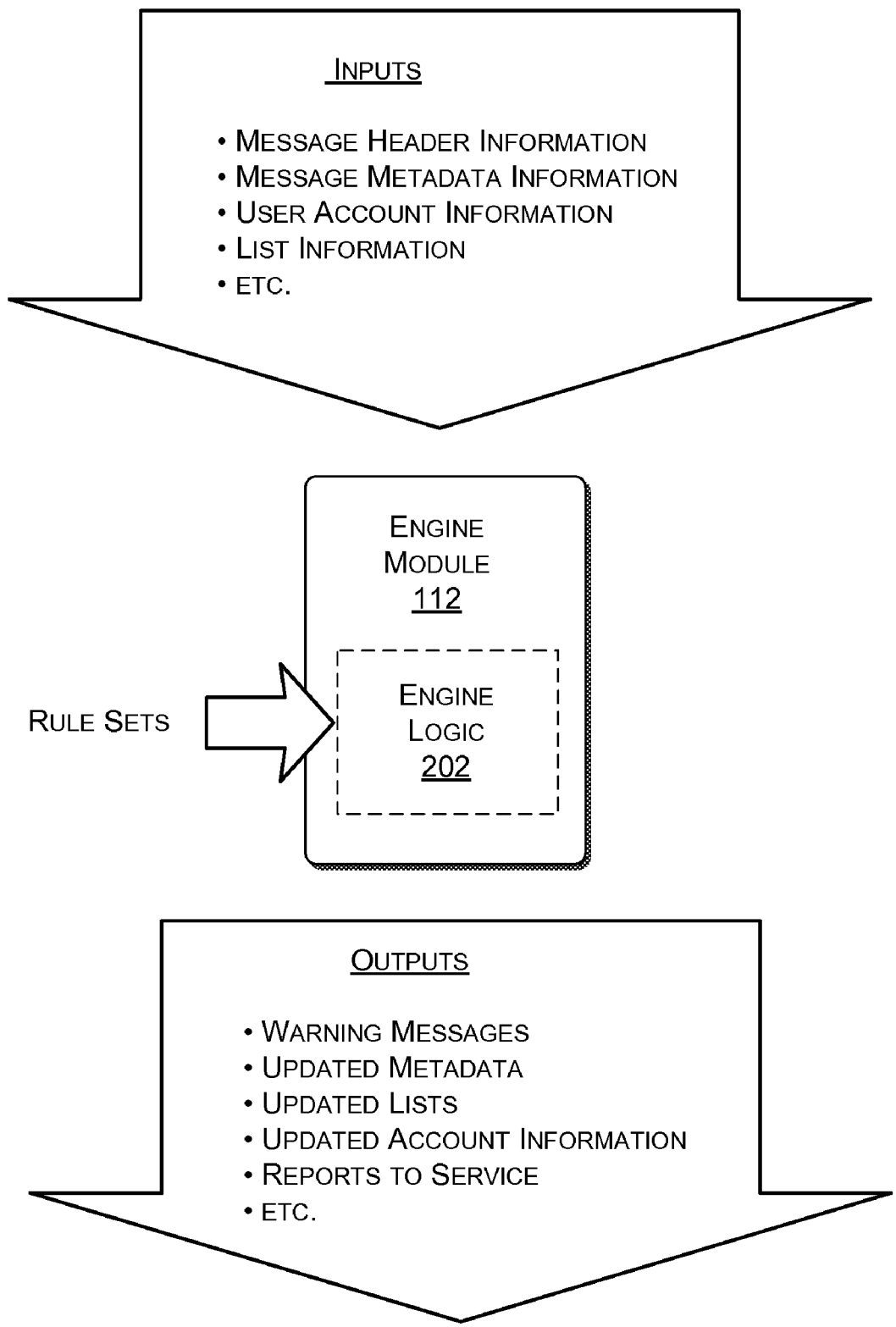
FIG. 2 shows an illustrative engine module for use in a user device in the system of FIG. 1, as applied to the processing of electronic messages.

FIG. 2 shows one manner of operation of the engine module 112, as applied to an electronic message application. The engine module 202 includes engine logic 202. The engine logic 202 governs the manner of operation of the engine module 112, e.g., by controlling the behavior of the engine module 202 upon the occurrence of various triggering events, such as the receipt of electronic messages. As described above, the engine logic 202 is configured using logical functions expressed in a description language.

The engine module 112 performs its processing based on various input items. The input items can include information extracted from a message's header (e.g., sender ID information, "from field" information, "to field" information, etc). The input items can also include message metadata. The input items can also include user account information (such as user-selected filter levels, etc.). The input items can include various lists (such as a block list for identifying message senders that should be blocked, a safe list for identifying message senders that are allowed, etc.), and so on.

The engine module 112 can process the input items to provide one or more outputs. The outputs can include one or more safety warnings alerting the user to an assessed level of safety associated with the message. The outputs can also include updated message metadata. The outputs can also include updated lists. The outputs can also include updated account information (e.g., filters). The outputs can also include various reports sent to the network-accessible service 102 (e.g., for use in updating security-related information maintained by the network-accessible service 102), and so on.

A.2. Engine Logic

Figure 3:
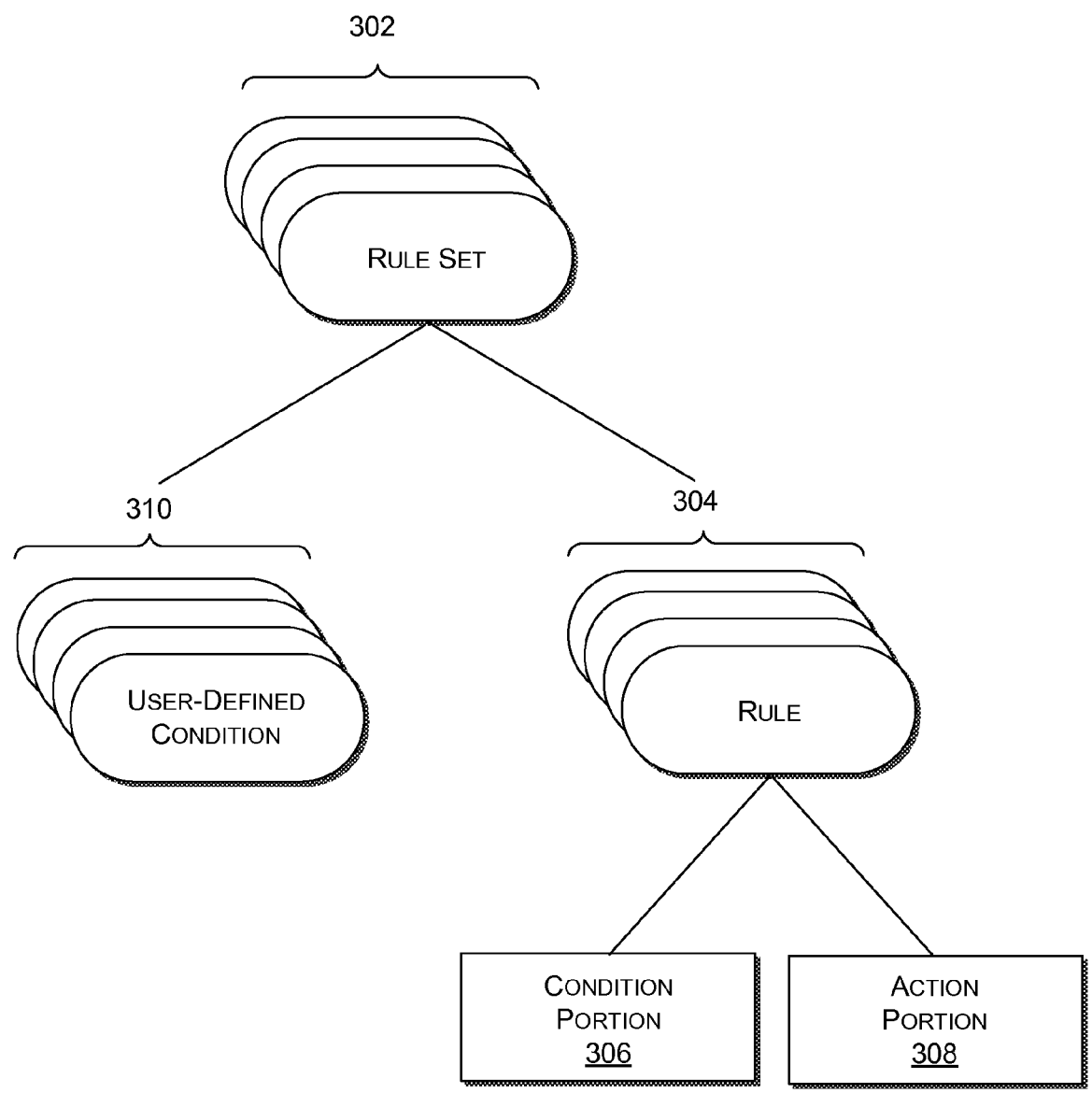
FIG. 3 shows an illustrative structure of engine logic, which may include a plurality of rule sets, each rule set including one or more rules.

FIG. 3 shows an overview of one implementation of the engine logic. As described above, the engine logic is expressed in a description language, such as XML. The engine logic describes (or specifies) the functions that compose the engine logic, but does not itself include the executable binaries that will actually implement the functions. The engine module 112 will use the engine logic to populate a parse tree in memory. The leaf nodes in the parse tree are associated with executable functions. The engine module 112 processes events (e.g., the receipt of new messages) using the functions identified in the parse tree. In this sense, the engine logic expressed in the description language serves as instructions for configuring the generic engine module 112.

As shown in FIG. 3, the engine logic can include one or more rule sets 302. Each rule set includes one or more rules 304. The rules in a rule set perform actions in a general category of operation. For example, in the case of an application that processes electronic messages, a first rule set can be used to assess the safety level of an incoming electronic message. A second rule set can be used to block a sender (upon the user entering an instruction to block a message sender). A third rule set can be used to allow a sender (upon the user entering an instruction to allow a message sender). A fourth rule set can be used to add a contact to a contact list (upon the user entering an instruction to add a contact). In operation, the first rule set can be invoked when a message is received to assess the level of safety of the message and to inform the user of the level (using an appropriate warning message). The user can take an action based on the assessed level, and one or more of the second, third, and fourth rule sets can be invoked depending on the type of action taken by the user. Other applications can use different types of rule sets devoted to different general functions. A single schema can be used to specify how to form well-defined rules in all of the rule sets. An Appendix at this end of this disclosure provides one illustrative schema for use in an electronic message application.

Each rule includes a condition portion 306 and an execution portion 308. The condition portion 306 defines a condition that is either satisfied or not satisfied with respect to a current event that has triggered the application of the rule, such as the receipt the new electronic message. The execution portion 308 defines one or more actions that are performed in the case that the condition specified in the condition portion 306 evaluates to true.

As will be described below, the condition portion 306 can express an arbitrary condition using various elements. One element is a built-in condition. The built-in condition defines a function that can be evaluated to return either a true or a false outcome (based on whether the condition applies). A schema can specify how to form well-formed built-in conditions.

Another element is a user-defined condition. A user-defined condition expresses a condition constructed using more elementary conditions (such as built-in conditions). The user-defined condition is represented by a label or name. The label serves as a shorthand way of referencing the logical function associated with the user-defined condition. An author may decide to create a user-defined condition for a logical function if this logical function is repeated in many different rules. The rules can reference the logical function using the shorthand label, rather than setting forth the full description of the logical function. This provision helps simplify the generation and application of a rule set.

FIG. 3 illustrates the use of user-defined conditions by showing a collection of user-defined conditions 310. These user-defined conditions are associated with a particular rule set. Any rules in the rule set may reference the user-defined conditions 310. In a sense, the user-defined conditions 310 may be thought of as a library portion of the rule set, e.g., that specifies logical functions that are referenced in the rules 304.

A condition portion 306 can combine various built-in conditions and/or user-defined conditions in an arbitrary manner using logical operators, such as, but not limited to, an AND operator, an OR operator, and so on. An AND operator requires that all of its child nodes must evaluate to true for that portion of the condition to hold true. An OR operator requires that only one of its child nodes must evaluate to true for that portion of the rule set to hold true.

Rule sets can be executed in one or at least two processing modes. In an IF-ELSE mode of processing, each of the rules in the rule set is processed until a rule is encountered that has a condition portion that is satisfied; at this point, one or more actions associated with the applicable rule are executed and then the processing terminates without processing the remaining rules in the rule set. In a list mode, all of the rules in the rule set are processed in the order identified in the rule set. An example of an IF-ELSE mode rule set is a rule set that assesses the level of the safety associated with a message. This rule set can include a sequence of rules. A first rule determines whether the message is unsafe (based on whether the condition portion of the rule is satisfied). If this rule is satisfied, the processing terminates, e.g., without executing rules that determine whether the rule is medium-level safe, safe, etc. (because these rules are irrelevant if the message has already been assessed as unsafe). The above-described second, third, and fourth rule sets are examples of list mode rule sets. All of the rules in these rule sets are processed without prematurely terminating the processing.

FIG. 4 describes markup content corresponding to one illustrative rule in a rule set. The sample includes three sections. One section 402 corresponds to the condition portion of the rule. Another portion 404 corresponds to the execution portion of the rule. By way of overview, the condition portion defines the circumstance(s) in which the execution portion of the rule is to be applied. In other words, if the condition portion evaluates to true, then the execution portion of the rule is performed. If the condition portion evaluates to false, then the execution portion of the rule is not performed.

Section 406 corresponds to a user-defined section. The user-defined section defines one or more conditional functions, each of which is represented by a label, such as, in this case, "BlockDomainDetermination." The condition section 402 can make reference to any conditional function in the user-defined section 406 by identifying the label of the conditional function. This is advantageous because it simplifies writing of the condition section 402.

Figure 5:
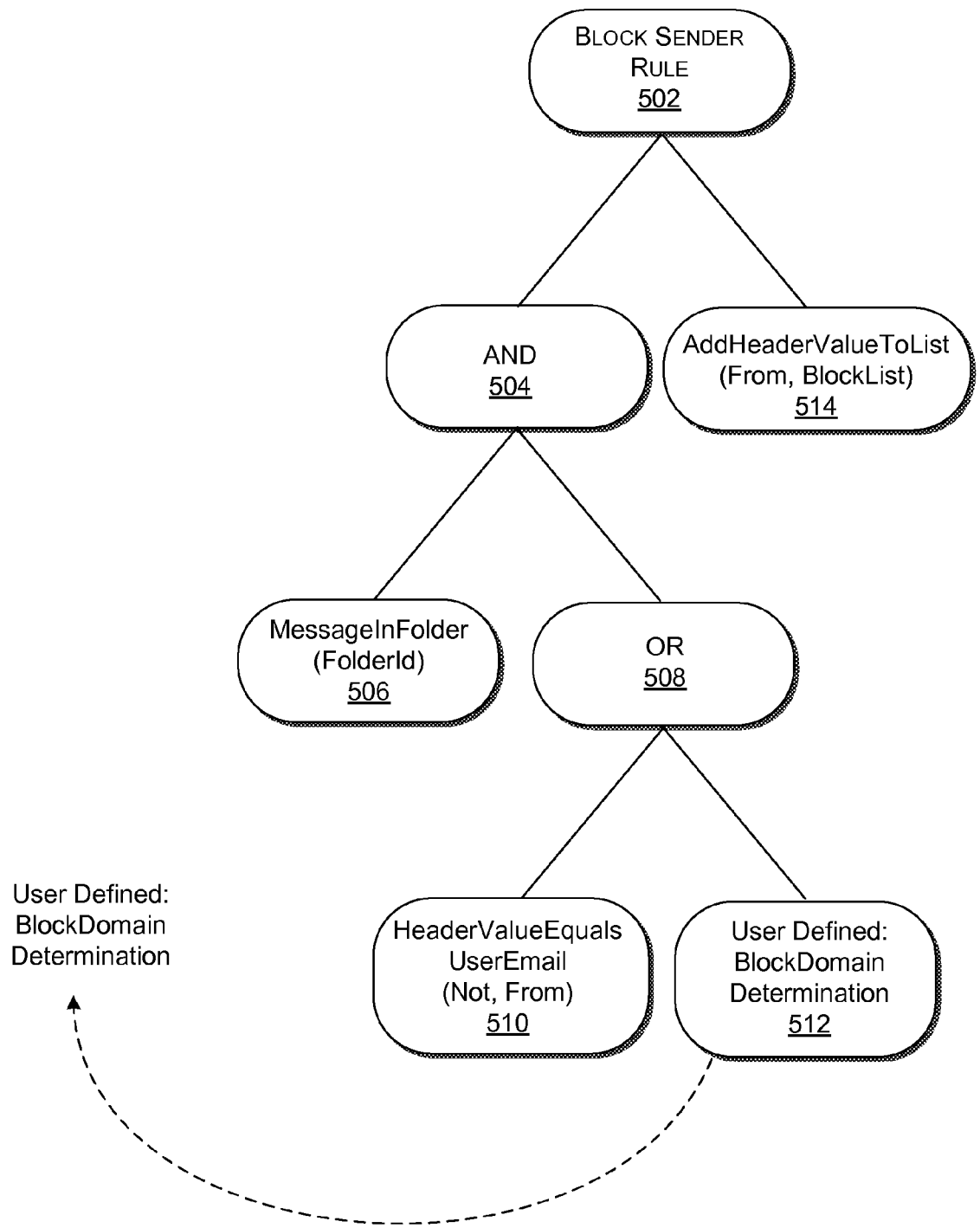
FIG. 5 depicts the sample of FIG. 4 in graphical tree form.

FIG. 5 shows a graphical tree-form depiction of the rule of FIG. 4. This figure will serve as a vehicle for providing additional detail regarding the structure of the rule. As indicated in this figure, the rule is identified as a Block Sender Rule 502. Functionally, this rule describes operations that are performed when the user enters an instruction to block a sender upon receipt of an electronic message. The rule 502 includes a condition section that includes nodes 504, 506, 508, 510, and 512. The rule 502 includes an execution section that includes nodes 514.

The condition section can combine together any arbitrary combination of built-in conditions and/or user-defined conditions using any arbitrary combination of Boolean operators. In this particular non-limiting case, the rule includes an AND node 504 which couples together the built-in condition "MsgInFolder" 506 and an OR node 508. The OR node 508, in turn, couples together the built-in condition "HeaderValueEqualUserEmail" 510 and the user-defined condition "BlockDomain Determination" 512. This rule 502 states that, in order for the rule to apply, both the condition "MsgInFolder" 506 and one of either the conditions "HeaderValueEqualUserEmail" 510 or "BlockDomainDetermination" 512 must evaluate to true. If this condition is satisfied, then the rule applies, and the node "AddHeaderToList" 514 is executed. More generally, this rule states that a sender is added to a list of blocked addresses when certain conditions are met (e.g., the message is not from the user, etc.).

The engine module 112 can be constructed using different paradigms. In one case, the engine module 112 uses object-oriented design to represent different objects. The engine module 112 abstracts common interfaces and actions in general multi-purpose objects. For example, a common interface can be provided to evaluate a variety of different conditions, such as Boolean operators, built-in conditions, and so on. In operation, any node in a condition portion of the engine logic can be fed into this interface for evaluation.

The use of object-oriented design makes the engine module 112 extensible. If an author wishes to add new functions to address a new application or environment, the author can add objects which share the same interfaces as other existing objects. The objects may be formed as new classes which inherent from existing base classes, and so on.

A.3. Illustrative Processing Functionality

Figure 6:
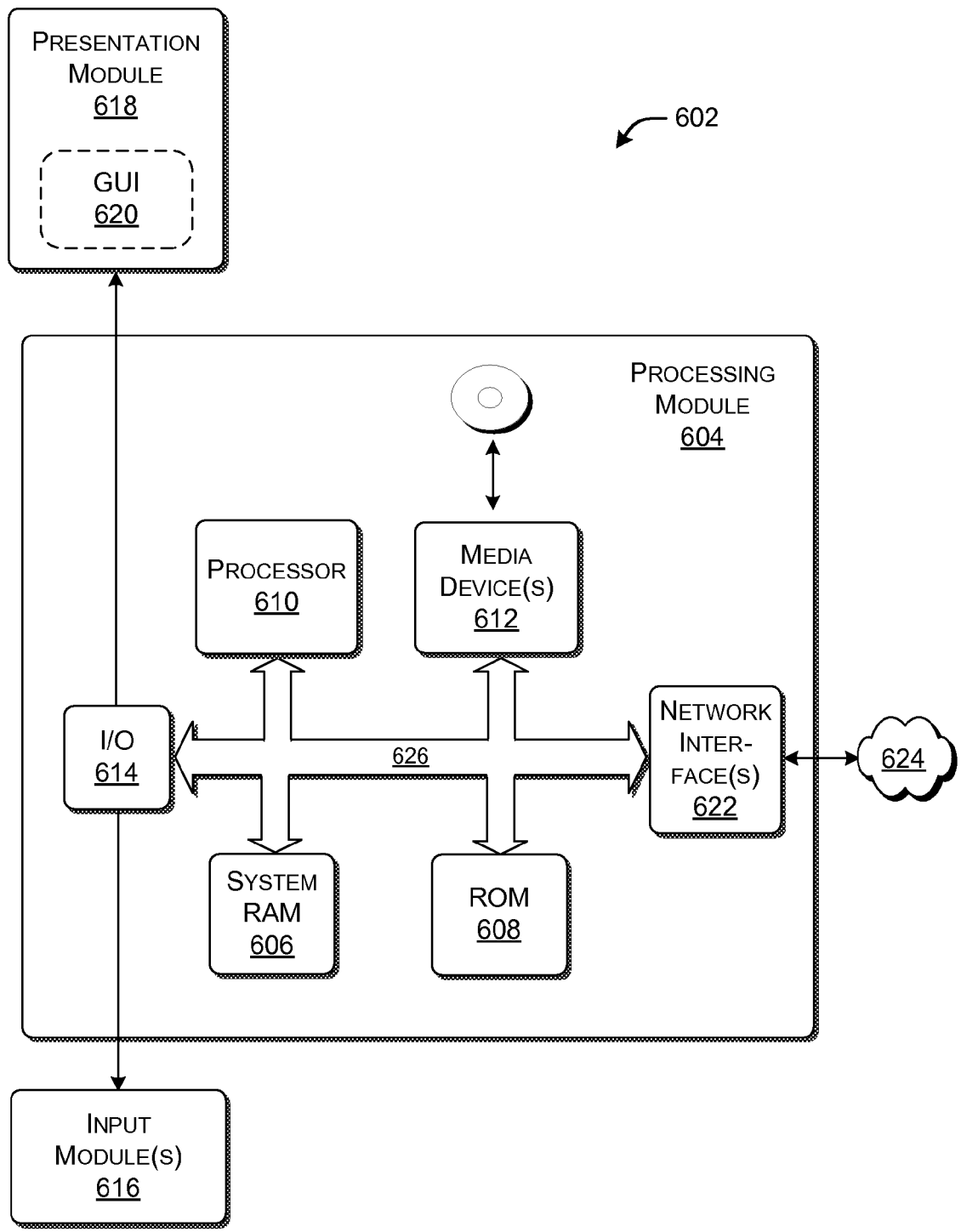
FIG. 6 shows illustrative processing functionality that can be used to implement any aspect of the system of FIG. 1.

FIG. 6 sets forth illustrative processing functionality 602 that can be used to implement any aspect of system 100 shown in FIG. 1. In one non-limiting case, for instance, the processing functionality 602 may represent any computer machine used by the system 100, e.g., to implement any aspect of a server-side computer (associated with the network-accessible service 102, etc.), to implement any aspect of any user device (104, 106), and so on.

The processing functionality 602 can include a processing module 604 for implementing various processing functions. The processing module 604 can include volatile and non-volatile memory, such as RAM 606 and ROM 608, as well as one or more processors 610. The processing functionality 602 can perform various operations identified above when the processor(s) 610 executes instructions that are maintained by memory (e.g., 606, 608, or elsewhere). The processing functionality 602 also optionally includes various media devices 612, such as a hard disk module, an optical disk module, and so forth.

The processing functionality 602 also includes an input/output module 614 for receiving various inputs from the user (via input modules 616), and for providing various outputs to the user (via output modules). One particular output mechanism may include a presentation module 618 and an associated graphical user interface (GUI) 620. The processing functionality 602 can also include one or more network interfaces 622 for exchanging data with other devices via one or more communication conduits 624. One or more communication buses 626 communicatively couple the above-described components together.

B. Illustrative Procedures

Figure 7:
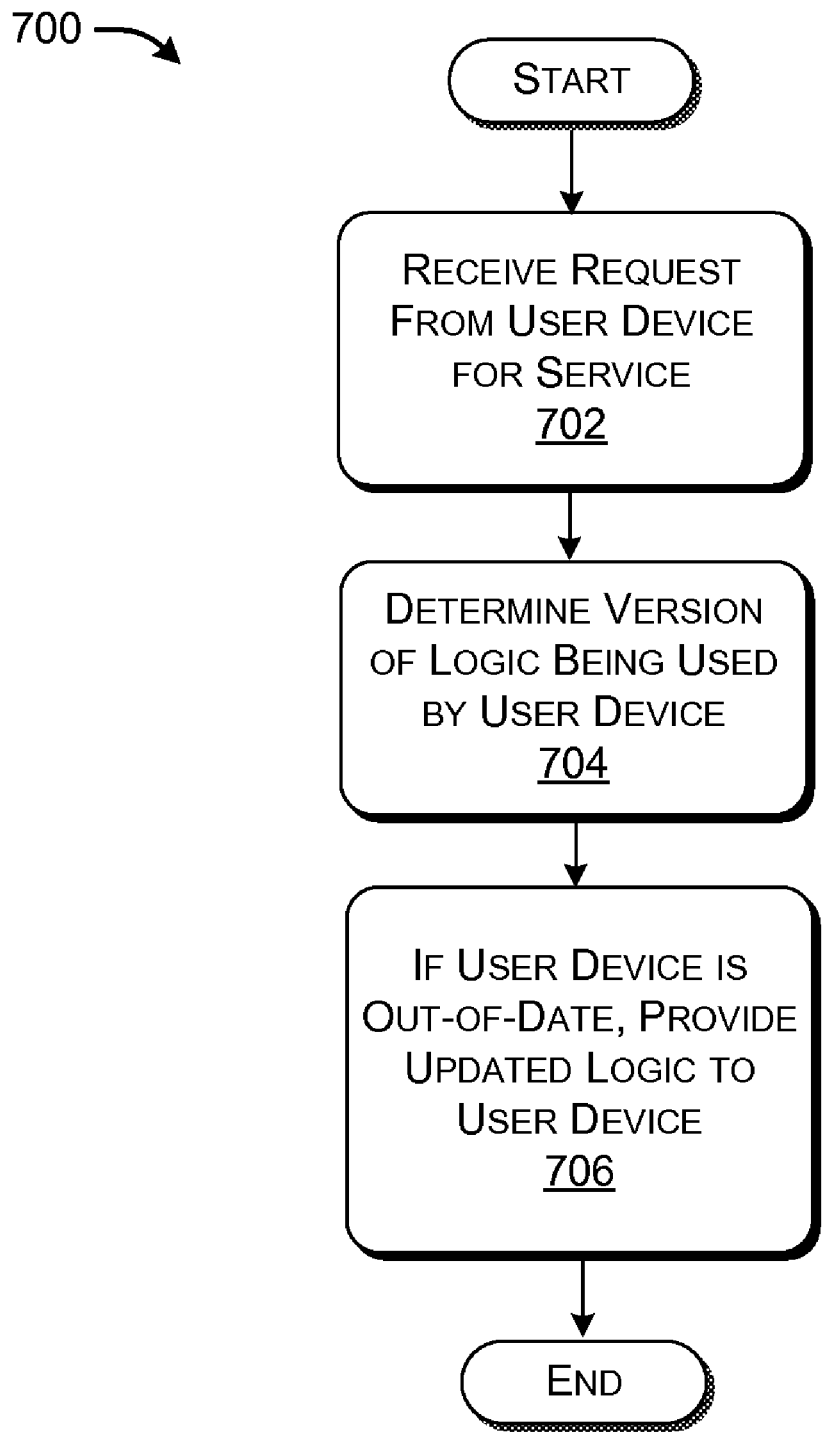
FIG. 7 is a flowchart that shows an illustrative procedure for providing updated engine logic to a user device.
Figure 8:
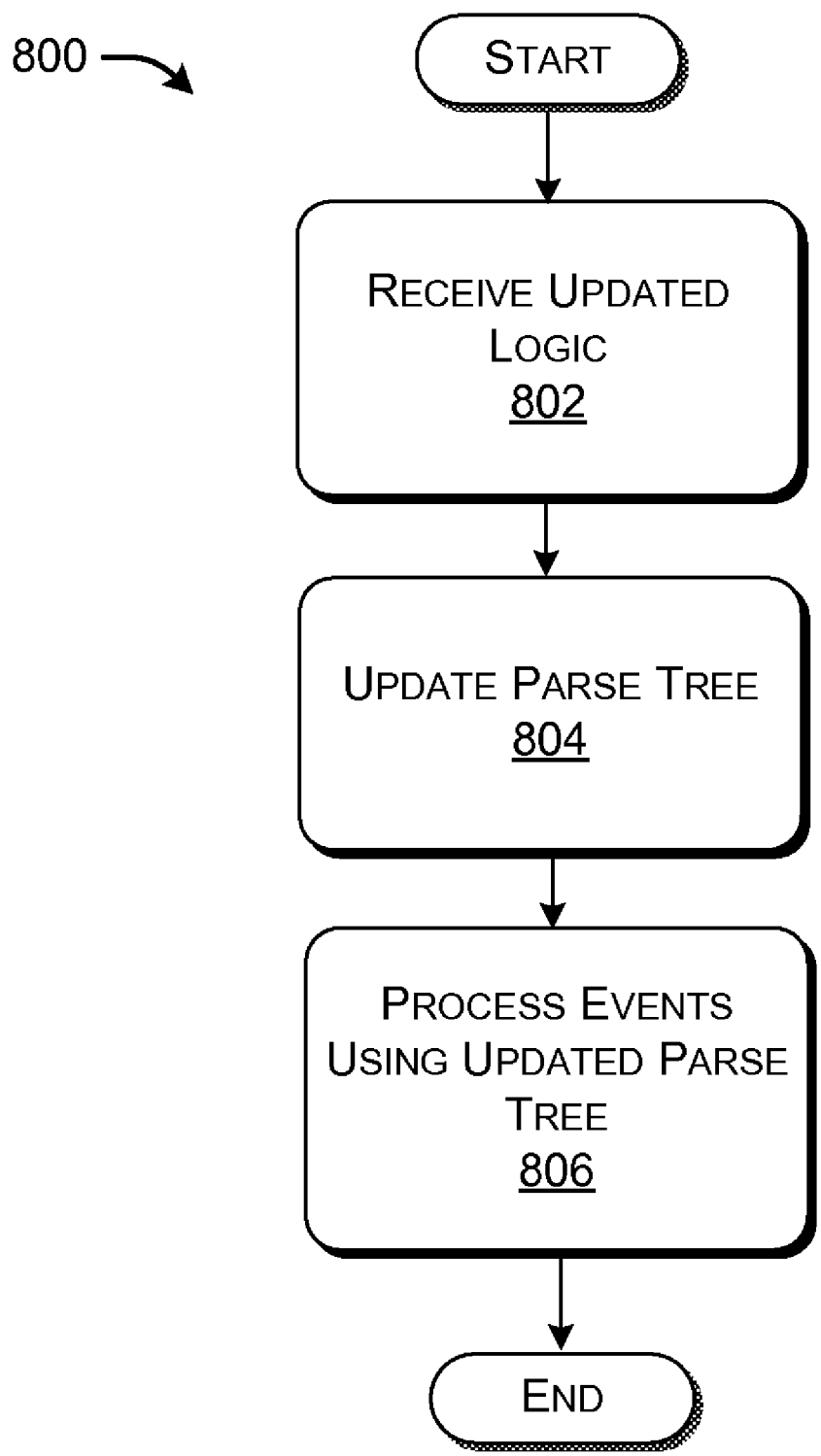
FIG. 8 is a flowchart that shows an illustrative procedure for use by a user device in acting on received updated engine logic.
Figure 9:
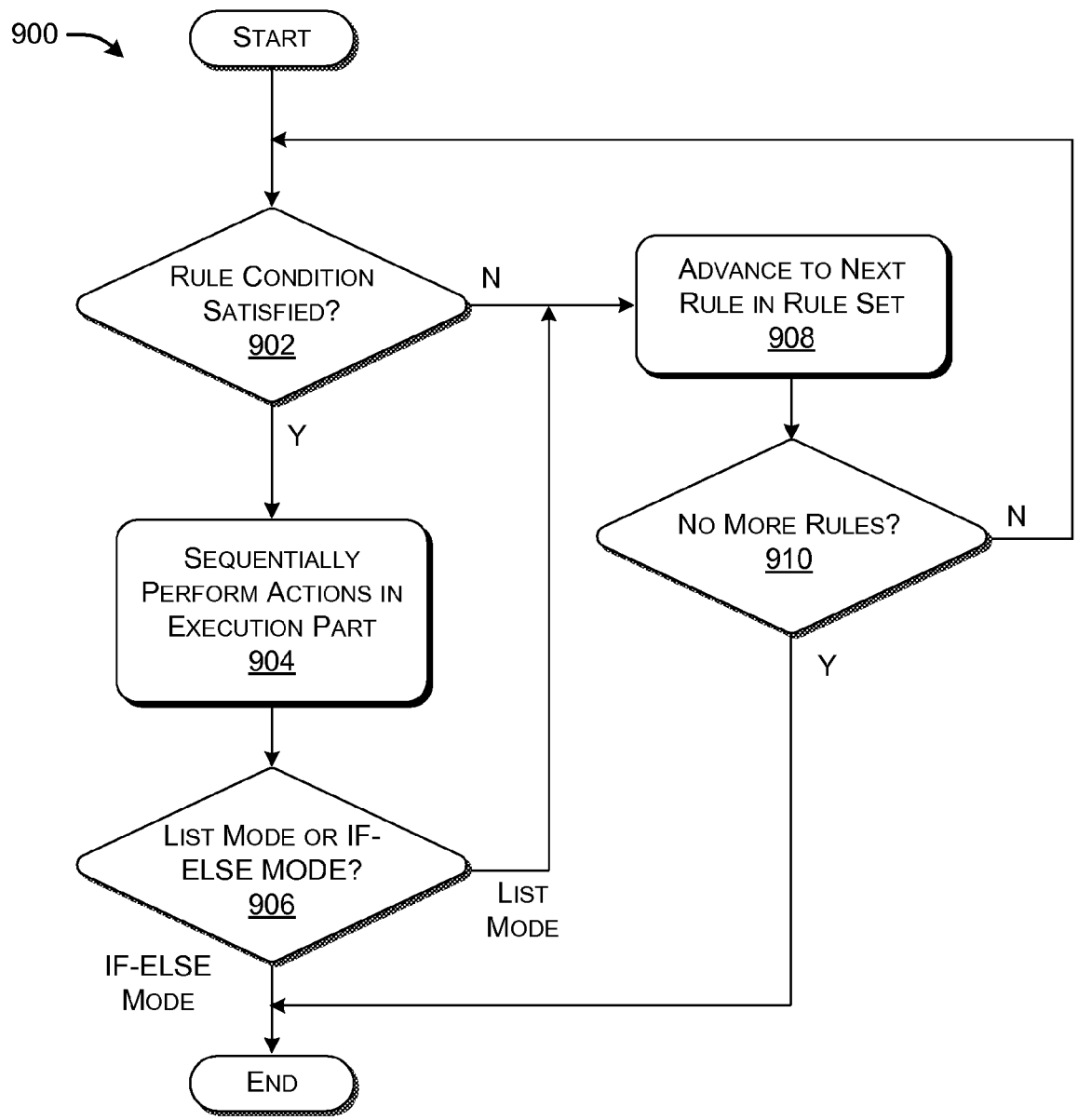
FIG. 9 is a flowchart that shows an illustrative procedure for processing events using engine logic.

FIGS. 7-9 show procedures which explain the operation of the system 100 in flow chart form. To facilitate discussion, certain operations are described as constituting distinct blocks performed in a certain order. Such implementations are illustrative and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

As many of the functions described in the flowcharts have already been set forth in Section A, Section B serves in part as a review of those functions.

B.1. Downloading Updated Engine Logic

FIG. 7 is a flowchart that shows a procedure 700 for downloading updated engine logic from the network-accessible service 102 to a user device, such as representative user device 104. There are many ways for a user device to update the engine logic; the procedure 700 represents only one way of receiving this information.

In block 702, the service-side update module 114 receives a request from the client-side update module 116 to download updated engine logic. The user device 104 may make this request whenever it contacts the network-accessible service 102 for any reason. Or the user device 104 may periodically make such a request. Or the network-accessible service 102 can independently initiate the downloading process (e.g., without being prompted to do so by the user device 104).

In block 704, either the service-side update module 114 or the client-side update module 116 can determine whether there is updated engine logic to send to the user device 104. These modules can perform this function comparing the current version of the engine logic with the version of the engine logic that is presently implemented by user device 104. If the versions differ, then the user device 104 is in need of an update. In one case, the service-side update module 114 can perform this function, in which case it receives version information from the user device 104 (which identifies the present version being used by the user device 104). In another case, the client-side update module 116 performs this function, in which case it receives version information from the network-accessible service 102 (which identifies the most current version of the engine logic maintained by the service 102).

In block 706, if it has been determined that the user device 104 does not have the most current version, this version is downloaded to the user device 104.

FIG. 8 is a flowchart which depicts a procedure 800 for receiving and processing updated engine logic at the user device 104. The procedure 800 of FIG. 8 is performed after the procedure 700 of FIG. 7.

In block 802, the client-side update module 116 receives the updated engine logic.

In block 804, the client-side update module 116 updates a parse tree in memory with the updated engine logic. This operation entails creating the type of tree structure shown in the sample of FIG. 5 in memory. Keep in mind that FIG. 5 shows only a sample of one rule in one rule set, so a complete parse tree will be more complex.

In block 806, the engine module 112 uses the updated parse tree to process events. In the case of an electronic message application, this block entails processing incoming electronic messages using the parse tree, e.g., by assessing the safety of the electronic messages and performing actions on the messages based thereon. The next subsection provides additional details regarding one way of implementing block 806.

B.2. Processing Events Using the Engine Logic

FIG. 9 is a flowchart which depicts a procedure 900 for processing events using engine logic. More specifically, the engine module 112 of the user device 104 processes the rules in an applicable rule set in succession, e.g., one after the other in the order identified in the rule set. The procedure 900 explains the manner in which the engine module 900 processes these rules. In one illustrative implementation, the engine module 112 uses a depth-first recursive search technique to process rules in the parse tree.

In block 902, the engine module 112 determines whether a rule is satisfied. In other words, the engine module 112 determines whether the conditional portion of the rule evaluates to true.

In block 904, if the rule's condition is satisfied, the engine module 112 executes the action associated with the rule. If there are several actions to perform, the engine module 112 sequentially executes these actions in the order identified in the rule.

In block 906, the engine module 112 determines whether the rule set associated with the rule is identified as a list mode rule set or an IF-ELSE mode rule set. An appropriate tag in the description language can provide this mode information. If the rule set is a list mode rule set, then the engine module 112 advances to the next rule in the rule set (in block 908). This is because the list mode involves processing all of the rules in the rule set regardless of the applicability of the rules. If there are no more rules in the rule set (as determined in block 910), then processing terminates.

If the rule set is an IF-ELSE mode rule set, the engine module 112 terminates the processing. This is because the IF-ELSE mode involves processing the rules in a rule set until the first rule is encountered which evaluates to true, upon which the processing terminates.

APPENDIX

Illustrative Schema

The following is an illustrative schema for a collection of rule sets associated with an electronic message application.

```xml
                                      SpamAndSafetyRules_v1
<?xml version="1.0" encoding="utf-8" ?>
<xsd:schema
targetNamespace="http://hmdevsrv/schemas/backend/DeltaSync/SpamAndSafety.xsd"
              elementFormDefault="qualified"

xmlns="http://hmdevsrv/schemas/backend/DeltaSync/SpamAndSafety.xsd"

xmlns:tns="http://hmdevsrv/schemas/backend/DeltaSync/SpamAndSafety.xsd"
              xmlns:xsd="http://www.w3.org/2001/XMLSchema">

<!-- ~~~~~~~~~~~~~~~~~~~~~ Enumeration Definitions ~~~~~~~~~~~~~~~~~~~~~~~ -->

<xsd:simpleType name="CaseSensitivity">
        <xsd:restriction base="xsd:string">
            <xsd:enumeration value="Ignore"/>
            <xsd:enumeration value="Heed"/>
        </xsd:restriction>
    </xsd:simpleType>

<xsd:simpleType name="OrderType">
        <xsd:restriction base="xsd:string">
            <xsd:enumeration value="Ignore"/>
            <xsd:enumeration value="Heed"/>
        </xsd:restriction>
    </xsd:simpleType>

<xsd:simpleType name="DuplicateHandlingType">
        <xsd:restriction base="xsd:string">
            <xsd:enumeration value="Remove"/>
            <xsd:enumeration value="Keep"/>
        </xsd:restriction>
    </xsd:simpleType>

<xsd:simpleType name="ComparisonConstraintType">
        <xsd:restriction base="xsd:string">
            <xsd:enumeration value="ExactMatch"/>
            <xsd:enumeration value="StartsWith"/>
            <xsd:enumeration value="EndsWith"/>
            <xsd:enumeration value="Contains"/>
        </xsd:restriction>
    </xsd:simpleType>

<xsd:simpleType name="MultipleValuesType">
        <xsd:restriction base="xsd:string">
            <xsd:enumeration value="First"/>
            <xsd:enumeration value="Any"/>
            <xsd:enumeration value="All"/>
        </xsd:restriction>
    </xsd:simpleType>

<xsd:simpleType name="MultipleValuesTypeForActions">
        <xsd:restriction base="xsd:string">
            <xsd:enumeration value="First"/>
            <xsd:enumeration value="All"/>
        </xsd:restriction>
    </xsd:simpleType>

<xsd:simpleType name="ApplyIfType">
        <xsd:restriction base="xsd:string">
            <xsd:enumeration value="SingleMessage"/>
            <xsd:enumeration value="MultipleMessages"/>
            <xsd:enumeration value="Always"/>
        </xsd:restriction>
```

SpamAndSafetyRules_v1

```xml
</xsd:simpleType>

<xsd:simpleType name="SafetyLevel">
   <xsd:restriction base="xsd:string">
      <xsd:enumeration value="Unsafe"/>
      <xsd:enumeration value="MediumSafe"/>
      <xsd:enumeration value="Safe"/>
      <xsd:enumeration value="MailingListAllowed"/>
      <xsd:enumeration value="MailingListNotAllowed"/>
   </xsd:restriction>
</xsd:simpleType>

<xsd:simpleType name="InputType">
   <xsd:restriction base="xsd:string">
      <xsd:enumeration value="BlockDomain"/>
      <xsd:enumeration value="TrustDomain"/>
      <xsd:enumeration value="BounceMessage"/>
      <xsd:enumeration value="UnsubscribeFromMailingList"/>
      <xsd:enumeration value="ReportToJMR"/>
      <xsd:enumeration value="RemoveFromMailingListSafeList"/>
   </xsd:restriction>
</xsd:simpleType>

<xsd:simpleType name="RequestParamEnum">
   <xsd:restriction base="xsd:string">
      <xsd:enumeration value="BounceMessage"/>
      <xsd:enumeration value="UnsubscribeFromMailingList"/>
      <xsd:enumeration value="ReportToJMR"/>
   </xsd:restriction>
</xsd:simpleType>

<!--
<xsd:simpleType name="MessagePropertyTypeEnum">
   <xsd:restriction base="xsd:string">
      <xsd:enumeration value="Tag"/>
   </xsd:restriction>
</xsd:simpleType>
-->

<xsd:simpleType name="FolderID">
   <xsd:restriction base="xsd:string">
      <xsd:enumeration value="00000000-0000-0000-0000-000000000001"/> <!-- Inbox -->
      <xsd:enumeration value="00000000-0000-0000-0000-000000000002"/> <!-- Trash -->
      <xsd:enumeration value="00000000-0000-0000-0000-000000000003"/> <!-- Saved -->
      <xsd:enumeration value="00000000-0000-0000-0000-000000000004"/> <!-- Draft -->
      <xsd:enumeration value="00000000-0000-0000-0000-000000000005"/> <!-- BulkMail -->
      <xsd:enumeration value="00000000-0000-0000-0000-000000000006"/> <!-- Hidden Trash -->
      <xsd:enumeration value="00000000-0000-0000-0000-000000000007"/> <!-- Hidden Config -->
      <xsd:enumeration value="00000000-0000-0000-0000-000000000008"/> <!-- Hidden Saved -->
      <xsd:enumeration value="00000000-0000-0000-0000-000000000009"/> <!-- OIM -->
   </xsd:restriction>
</xsd:simpleType>

<xsd:simpleType name="NounEnum">
   <xsd:restriction base="xsd:string">
      <xsd:enumeration value="a"/>        <!-- SendersEmailAddress-->
      <xsd:enumeration value="n"/>        <!-- SendersName -->
      <xsd:enumeration value="s"/>        <!-- Subject -->
      <xsd:enumeration value="t"/>        <!-- ToOrCCHeader -->
```

SpamAndSafetyRules_v1

```xml
    </xsd:restriction>
</xsd:simpleType>

<xsd:simpleType name="VerbEnum">
    <xsd:restriction base="xsd:string">
        <xsd:enumeration value="c"/>      <!-- Contains -->
        <xsd:enumeration value="n"/>      <!-- DoesNotContain -->
        <xsd:enumeration value="i"/>      <!-- EqualTo -->
        <xsd:enumeration value="w"/>      <!-- ContainsWords -->
        <xsd:enumeration value="s"/>      <!-- StartsWith -->
        <xsd:enumeration value="e"/>      <!-- EndsWith -->
    </xsd:restriction>
</xsd:simpleType>

<xsd:simpleType name="RuleSetExecutionType">
    <xsd:restriction base="xsd:string">
        <xsd:enumeration value="list"/>
        <xsd:enumeration value="ifelse"/>
    </xsd:restriction>
</xsd:simpleType>

<xsd:simpleType name="AddressLists">
    <xsd:restriction base="xsd:string">
        <xsd:enumeration value="ContactList"/>
        <xsd:enumeration value="SafeList"/>
        <xsd:enumeration value="BlockList"/>
        <xsd:enumeration value="MailingListSafeList"/>
    </xsd:restriction>
</xsd:simpleType>

<xsd:simpleType name="DomainLists">
    <xsd:restriction base="xsd:string">
        <xsd:enumeration value="SafeDomainList"/>
        <xsd:enumeration value="BlockDomainList"/>
    </xsd:restriction>
</xsd:simpleType>

<xsd:group name="AllLists">
    <xsd:choice>
        <xsd:element name="addressList" type="tns:AddressLists"/>
        <xsd:element name="domainList" type="tns:DomainLists"/>
    </xsd:choice>
</xsd:group>

<!-- ~~~~~~~~~~~~~~~~~~~~~ New Types Definitions ~~~~~~~~~~~~~~~~~~~~~ -->

<xsd:complexType name="MyIDREF">
    <xsd:simpleContent>
        <xsd:extension base="xsd:IDREF">
            <xsd:attribute name="negate" type="xsd:boolean" default="false"/>
            <xsd:attribute name="applyIf" type="tns:ApplyIfType" default="Always"/>
        </xsd:extension>
    </xsd:simpleContent>
</xsd:complexType>

<xsd:complexType name="Filter">
    <xsd:sequence>
        <xsd:element name="noun" type="tns:NounEnum"/>
        <xsd:element name="verb" type="tns:VerbEnum"/>
        <xsd:element name="folder" type="tns:FolderID"/>
    </xsd:sequence>
```

SpamAndSafetyRules_v1

```xml
</xsd:complexType>

<xsd:complexType name="And">
   <xsd:choice minOccurs="2" maxOccurs="unbounded">
      <xsd:element name="And" type="tns:And"/>
      <xsd:element name="Or" type="tns:Or"/>
         <xsd:group ref="tns:BuiltInConditions"/>
      <xsd:element name="UserDefinedCondition" type="tns:MyIDREF"/>
   </xsd:choice>
   <xsd:attribute name="negate" type="xsd:boolean" default="false"/>
   <xsd:attribute name="applyIf" type="tns:ApplyIfType" default="Always"/>
</xsd:complexType>

<xsd:complexType name="Or">
   <xsd:choice minOccurs="2" maxOccurs="unbounded">
      <xsd:element name="And" type="tns:And"/>
      <xsd:element name="Or" type="tns:Or"/>
      <xsd:group ref="tns:BuiltInConditions"/>
      <xsd:element name="UserDefinedCondition" type="tns:MyIDREF"/>
   </xsd:choice>
   <xsd:attribute name="negate" type="xsd:boolean" default="false"/>
   <xsd:attribute name="applyIf" type="tns:ApplyIfType" default="Always"/>
</xsd:complexType>

<xsd:group name="BooleanExpressions">
   <xsd:choice>
      <xsd:element name="And" type="tns:And"/>
      <xsd:element name="Or" type="tns:Or"/>
   </xsd:choice>
</xsd:group>

<!-- ~~~~~~~~~~~~~~~~~~~~~~~~~ Condition Definitions ~~~~~~~~~~~~~~~~~~~~~~~~~
-->

<xsd:complexType name="Condition">
   <xsd:attribute name="negate" type="xsd:boolean" default="false"/>
   <xsd:attribute name="applyIf" type="tns:ApplyIfType" default="Always"/>
</xsd:complexType>

<xsd:complexType name="ComparisonCondition">
   <xsd:complexContent>
      <xsd:extension base="tns:Condition">
         <xsd:attribute name="ifMultiple" type="tns:MultipleValuesType" default="First"/>
         <xsd:attribute name="case" type="tns:CaseSensitivity" use="optional" default="Ignore"/>
      </xsd:extension>
   </xsd:complexContent>
</xsd:complexType>

<xsd:complexType name="HeaderValueExistsInList">
   <xsd:complexContent>
      <xsd:extension base="tns:ComparisonCondition">
         <xsd:sequence>
            <xsd:element name="header" type="xsd:string"/>
            <xsd:element name="list" type="tns:AddressLists"/>
         </xsd:sequence>
      </xsd:extension>
   </xsd:complexContent>
</xsd:complexType>

<xsd:complexType name="HeaderValueDomainExistsInList">
```

SpamAndSafetyRules_v1
```
      <xsd:complexContent>
        <xsd:extension base="tns:ComparisonCondition">
          <xsd:sequence>
            <xsd:element name="header" type="xsd:string"/>
            <xsd:element name="list" type="tns:DomainLists"/>
          </xsd:sequence>
        </xsd:extension>
      </xsd:complexContent>
    </xsd:complexType>

<xsd:complexType name="HeaderExists">
      <xsd:complexContent>
        <xsd:extension base="tns:Condition">
          <xsd:sequence>
            <xsd:element name="header" type="xsd:string"/>
          </xsd:sequence>
        </xsd:extension>
      </xsd:complexContent>
    </xsd:complexType>

<xsd:complexType name="HeaderValueEquals">
      <xsd:complexContent>
        <xsd:extension base="tns:ComparisonCondition">
          <xsd:sequence>
            <xsd:element name="header" type="xsd:string"/>
            <xsd:element name="value" type="xsd:string"/>
          </xsd:sequence>
          <xsd:attribute name="constraint" type="tns:ComparisonConstraintType" use="required"/>
        </xsd:extension>
      </xsd:complexContent>
    </xsd:complexType>

<xsd:complexType name="HeaderValueEqualsUserEmail">
      <xsd:complexContent>
        <xsd:extension base="tns:ComparisonCondition">
          <xsd:sequence>
            <xsd:element name="header" type="xsd:string"/>
          </xsd:sequence>
        </xsd:extension>
      </xsd:complexContent>
    </xsd:complexType>

<xsd:complexType name="HeaderValueDomainEqualsUserDomain">
      <xsd:complexContent>
        <xsd:extension base="tns:ComparisonCondition">
          <xsd:sequence>
            <xsd:element name="header" type="xsd:string"/>
          </xsd:sequence>
        </xsd:extension>
      </xsd:complexContent>
    </xsd:complexType>

<xsd:complexType name="ReceivedBetween">
      <xsd:complexContent>
        <xsd:extension base="tns:Condition">
          <xsd:sequence>
            <xsd:element name="begin" type="xsd:dateTime"/>
            <xsd:element name="end" type="xsd:dateTime"/>
          </xsd:sequence>
        </xsd:extension>
      </xsd:complexContent>
    </xsd:complexType>
```

SpamAndSafetyRules_v1

```xml
<xsd:complexType name="HeaderOccurrenceOrder">
  <xsd:complexContent>
    <xsd:extension base="tns:Condition">
      <xsd:sequence>
        <xsd:element name="header1" type="xsd:string"/>
        <xsd:element name="header2" type="xsd:string"/>
      </xsd:sequence>
    </xsd:extension>
  </xsd:complexContent>
</xsd:complexType>

<xsd:complexType name="MessageSafetyLevelEquals">
  <xsd:complexContent>
    <xsd:extension base="tns:Condition">
      <xsd:sequence>
        <xsd:element name="level" type="tns:SafetyLevel"/>
      </xsd:sequence>
    </xsd:extension>
  </xsd:complexContent>
</xsd:complexType>

<xsd:complexType name="AddrsWithSameDomainExistInList">
  <xsd:complexContent>
    <xsd:extension base="tns:ComparisonCondition">
      <xsd:sequence>
        <xsd:element name="header" type="xsd:string"/>
        <xsd:element name="list" type="tns:AddressLists"/>
      </xsd:sequence>
    </xsd:extension>
  </xsd:complexContent>
</xsd:complexType>

<xsd:complexType name="GetExternalInput">
  <xsd:complexContent>
    <xsd:extension base="tns:Condition">
      <xsd:sequence>
        <xsd:element name="requiredInput" type="tns:InputType"/>
        <xsd:element name="result" type="xsd:boolean"/>
      </xsd:sequence>
    </xsd:extension>
  </xsd:complexContent>
</xsd:complexType>

<xsd:complexType name="AreHeaderValuesEqual">
  <xsd:complexContent>
    <xsd:extension base="tns:ComparisonCondition">
      <xsd:sequence>
        <xsd:element name="header1" type="xsd:string"/>
        <xsd:element name="header2" type="xsd:string"/>
      </xsd:sequence>
      <xsd:attribute name="order" type="tns:OrderType" default="Ignore"/>
      <xsd:attribute name="duplicates" type="tns:DuplicateHandlingType" default="Remove"/>
    </xsd:extension>
  </xsd:complexContent>
</xsd:complexType>

<xsd:complexType name="IsHeaderValueRFC821Compliant">
  <xsd:complexContent>
    <xsd:extension base="tns:Condition">
      <xsd:sequence>
        <xsd:element name="header" type="xsd:string"/>
```

SpamAndSafetyRules_v1

```xml
      </xsd:sequence>
      <xsd:attribute name="ifMultiple" type="tns:MultipleValuesType" default="First"/>
    </xsd:extension>
  </xsd:complexContent>
</xsd:complexType>

<xsd:complexType name="MessageInFolder">
  <xsd:complexContent>
    <xsd:extension base="tns:Condition">
      <xsd:sequence>
        <xsd:element name="folder" type="tns:FolderID"/>
      </xsd:sequence>
    </xsd:extension>
  </xsd:complexContent>
</xsd:complexType>

<xsd:complexType name="IsSafeSender">
  <xsd:complexContent>
    <xsd:extension base="tns:Condition"/>
  </xsd:complexContent>
</xsd:complexType>

<!--
<xsd:complexType name="IsMessageLinked">
  <xsd:complexContent>
    <xsd:extension base="tns:Condition"/>
  </xsd:complexContent>
</xsd:complexType>
-->

<xsd:complexType name="IsSenderInWhiteList">
  <xsd:complexContent>
    <xsd:extension base="tns:Condition"/>
  </xsd:complexContent>
</xsd:complexType>

<xsd:complexType name="IsHeaderSingleValued">
  <xsd:complexContent>
    <xsd:extension base="tns:Condition">
      <xsd:sequence>
        <xsd:element name="header" type="xsd:string"/>
      </xsd:sequence>
    </xsd:extension>
  </xsd:complexContent>
</xsd:complexType>

<xsd:complexType name="IsMailVerified">
  <xsd:complexContent>
    <xsd:extension base="tns:Condition"/>
  </xsd:complexContent>
</xsd:complexType>

<xsd:complexType name="IsBondedSender">
  <xsd:complexContent>
    <xsd:extension base="tns:Condition"/>
  </xsd:complexContent>
</xsd:complexType>

<xsd:complexType name="MessageHasAttachments">
  <xsd:complexContent>
    <xsd:extension base="tns:Condition"/>
  </xsd:complexContent>
```

SpamAndSafetyRules_v1

```xml
</xsd:complexType>

<xsd:group name="BuiltInConditions">
  <xsd:choice>
    <xsd:element name="HeaderValueExistsInList" type="tns:HeaderValueExistsInList"/>
    <xsd:element name="HeaderValueDomainExistsInList" type="tns:HeaderValueDomainExistsInList"/>
    <xsd:element name="HeaderExists" type="tns:HeaderExists"/>
    <xsd:element name="HeaderValueEquals" type="tns:HeaderValueEquals"/>
    <xsd:element name="HeaderValueEqualsUserEmail" type="tns:HeaderValueEqualsUserEmail"/>
    <xsd:element name="ReceivedBetween" type="tns:ReceivedBetween"/>
    <xsd:element name="HeaderOccurrenceOrder" type="tns:HeaderOccurrenceOrder"/>
    <xsd:element name="MessageSafetyLevelEquals" type="tns:MessageSafetyLevelEquals"/>
    <xsd:element name="AddrsWithSameDomainExistInList" type="tns:AddrsWithSameDomainExistInList"/>
    <xsd:element name="GetExternalInput" type="tns:GetExternalInput"/>
    <xsd:element name="AreHeaderValuesEqual" type="tns:AreHeaderValuesEqual"/>

<xsd:element name="IsHeaderValueRFC821Compliant" type="tns:IsHeaderValueRFC821Compliant"/>
    <xsd:element name="MessageInFolder" type="tns:MessageInFolder"/>
    <xsd:element name="IsSafeSender" type="tns:IsSafeSender"/>
    <xsd:element name="IsSenderInWhiteList" type="tns:IsSenderInWhiteList"/>
    <xsd:element name="IsHeaderSingleValued" type="tns:IsHeaderSingleValued"/>
    <xsd:element name="IsMailVerified" type="tns:IsMailVerified"/>
    <xsd:element name="IsBondedSender" type="tns:IsBondedSender"/>
    <xsd:element name="MessageHasAttachments" type="tns:MessageHasAttachments"/>
    <xsd:element name="HeaderValueDomainEqualsUserDomain" type="tns:HeaderValueDomainEqualsUserDomain"/>
  </xsd:choice>
</xsd:group>

<!-- ~~~~~~~~~~~~~~~~~~~~~~ Action Definitions ~~~~~~~~~~~~~~~~~~~~~~~~~~~ -->

<xsd:complexType name="ActionBaseType">
  <xsd:attribute name="applyIf" type="tns:ApplyIfType" default="Always"/>
</xsd:complexType>

<xsd:complexType name="MarkMessageSafetyLevel">
  <xsd:complexContent>
    <xsd:extension base="tns:ActionBaseType">
      <xsd:sequence>
        <xsd:element name="level" type="tns:SafetyLevel"/>
      </xsd:sequence>
    </xsd:extension>
  </xsd:complexContent>
</xsd:complexType>

<xsd:complexType name="AddHeaderValueToList">
  <xsd:complexContent>
    <xsd:extension base="tns:ActionBaseType">
      <xsd:sequence>
        <xsd:element name="header" type="xsd:string"/>
        <xsd:element name="list" type="tns:AddressLists"/>
      </xsd:sequence>
      <xsd:attribute name="ifMultiple" type="tns:MultipleValuesTypeForActions" default="First"/>
      <xsd:attribute name="duplicates" type="tns:DuplicateHandlingType" default="Remove"/>
```

SpamAndSafetyRules_v1

```xml
      </xsd:extension>
    </xsd:complexContent>
  </xsd:complexType>

<xsd:complexType name="RemoveHeaderValueFromList">
    <xsd:complexContent>
      <xsd:extension base="tns:ActionBaseType">
        <xsd:sequence>
          <xsd:element name="header" type="xsd:string"/>
          <xsd:element name="list" type="tns:AddressLists"/>
        </xsd:sequence>
        <xsd:attribute name="ifMultiple" type="tns:MultipleValuesTypeForActions" default="First"/>
        <xsd:attribute name="duplicates" type="tns:DuplicateHandlingType" default="Remove"/>
      </xsd:extension>
    </xsd:complexContent>
  </xsd:complexType>

<xsd:complexType name="AddHeaderValueDomainToList">
    <xsd:complexContent>
      <xsd:extension base="tns:ActionBaseType">
        <xsd:sequence>
          <xsd:element name="header" type="xsd:string"/>
          <xsd:element name="list" type="tns:DomainLists"/>
        </xsd:sequence>
        <xsd:attribute name="ifMultiple" type="tns:MultipleValuesTypeForActions" default="First"/>
        <xsd:attribute name="duplicates" type="tns:DuplicateHandlingType" default="Remove"/>
      </xsd:extension>
    </xsd:complexContent>
  </xsd:complexType>

<xsd:complexType name="RemoveHeaderValueDomainFromList">
    <xsd:complexContent>
      <xsd:extension base="tns:ActionBaseType">
        <xsd:sequence>
          <xsd:element name="header" type="xsd:string"/>
          <xsd:element name="list" type="tns:DomainLists"/>
        </xsd:sequence>
        <xsd:attribute name="ifMultiple" type="tns:MultipleValuesTypeForActions" default="First"/>
        <xsd:attribute name="duplicates" type="tns:DuplicateHandlingType" default="Remove"/>
      </xsd:extension>
    </xsd:complexContent>
  </xsd:complexType>

<xsd:complexType name="RemoveAddrsWithSameDomainFromList">
    <xsd:complexContent>
      <xsd:extension base="tns:ActionBaseType">
        <xsd:sequence>
          <xsd:element name="header" type="xsd:string"/>
          <xsd:element name="list" type="tns:AddressLists"/>
        </xsd:sequence>
        <xsd:attribute name="ifMultiple" type="tns:MultipleValuesTypeForActions" default="First"/>
        <xsd:attribute name="duplicates" type="tns:DuplicateHandlingType" default="Remove"/>
      </xsd:extension>
    </xsd:complexContent>
  </xsd:complexType>
```

SpamAndSafetyRules_v1

```xsd
<xsd:complexType name="MarkMailVerified">
  <xsd:complexContent>
    <xsd:extension base="tns:ActionBaseType"/>
  </xsd:complexContent>
</xsd:complexType>

<xsd:complexType name="AddFilter">
  <xsd:complexContent>
    <xsd:extension base="tns:ActionBaseType">
      <xsd:sequence>
        <xsd:element name="header" type="xsd:string"/>
        <xsd:element name="filter" type="tns:Filter"/>
      </xsd:sequence>
      <xsd:attribute name="ifMultiple" type="tns:MultipleValuesTypeForActions" default="First"/>
      <xsd:attribute name="duplicates" type="tns:DuplicateHandlingType" default="Remove"/>
    </xsd:extension>
  </xsd:complexContent>
</xsd:complexType>

<xsd:complexType name="RemoveFilter">
  <xsd:complexContent>
    <xsd:extension base="tns:ActionBaseType">
      <xsd:sequence>
        <xsd:element name="header" type="xsd:string"/>
        <xsd:element name="filter" type="tns:Filter"/>
      </xsd:sequence>
      <xsd:attribute name="ifMultiple" type="tns:MultipleValuesTypeForActions" default="First"/>
      <xsd:attribute name="duplicates" type="tns:DuplicateHandlingType" default="Remove"/>
    </xsd:extension>
  </xsd:complexContent>
</xsd:complexType>

<xsd:complexType name="SetRequestParameter">
  <xsd:complexContent>
    <xsd:extension base="tns:ActionBaseType">
      <xsd:sequence>
        <xsd:element name="name" type="tns:RequestParamEnum"/>
        <xsd:element name="value" type="xsd:string" minOccurs="0"/>
      </xsd:sequence>
    </xsd:extension>
  </xsd:complexContent>
</xsd:complexType>

<xsd:complexType name="MoveMessageToFolder">
  <xsd:complexContent>
    <xsd:extension base="tns:ActionBaseType">
      <xsd:sequence>
        <xsd:element name="folder" type="tns:FolderID"/>
      </xsd:sequence>
    </xsd:extension>
  </xsd:complexContent>
</xsd:complexType>

<!--
<xsd:complexType name="SetMessageProperty">
  <xsd:complexContent>
    <xsd:extension base="tns:ActionBaseType">
```

```
SpamAndSafetyRules_v1
      <xsd:sequence>
        <xsd:element name="name" type="tns:MessagePropertyTypeEnum"/>
        <xsd:element name="value" type="xsd:string"/>
      </xsd:sequence>
    </xsd:extension>
  </xsd:complexContent>
</xsd:complexType>
-->

<xsd:group name="Actions">
  <xsd:choice>
    <xsd:element name="MarkMessageSafetyLevel" type="tns:MarkMessageSafetyLevel"/>
    <xsd:element name="AddHeaderValueToList" type="tns:AddHeaderValueToList"/>
    <xsd:element name="RemoveHeaderValueFromList"
type="tns:RemoveHeaderValueFromList"/>
    <xsd:element name="AddHeaderValueDomainToList"
type="tns:AddHeaderValueDomainToList"/>
    <xsd:element name="RemoveHeaderValueDomainFromList"
type="tns:RemoveHeaderValueDomainFromList"/>
    <xsd:element name="RemoveAddrsWithSameDomainFromList"
type="tns:RemoveAddrsWithSameDomainFromList"/>
    <xsd:element name="MarkMailVerified" type="tns:MarkMailVerified"/>
    <xsd:element name="AddFilter" type="tns:AddFilter"/>
    <xsd:element name="RemoveFilter" type="tns:RemoveFilter"/>
    <xsd:element name="SetRequestParameter" type="tns:SetRequestParameter"/>
    <xsd:element name="MoveMessageToFolder" type="tns:MoveMessageToFolder"/>
    <!-- <xsd:element name="SetMessageProperty" type="tns:SetMessageProperty"/>
-->
  </xsd:choice>
</xsd:group>

<!-- ~~~~~~~~~~~~~~~~~~~~~~~~~~~~~ Rule Definition ~~~~~~~~~~~~~~~~~~~~~~~~~~~~~
-->

<xsd:complexType name="UserDefinedCondition">
  <xsd:sequence>
    <xsd:group ref="tns:BooleanExpressions"/>
  </xsd:sequence>
  <xsd:attribute name="id" type="xsd:ID"/>
</xsd:complexType>

<xsd:complexType name="RuleSet">
  <xsd:sequence>
    <xsd:element name="UserDefinedConditions" minOccurs="0" maxOccurs="1">
      <xsd:complexType>
        <xsd:sequence>
          <xsd:element name="UserDefinedCondition" type="tns:UserDefinedCondition"
                   minOccurs="1" maxOccurs="unbounded"/>
        </xsd:sequence>
      </xsd:complexType>
    </xsd:element>
    <xsd:element name="Rule" minOccurs="1" maxOccurs="unbounded">
      <xsd:complexType>
        <xsd:sequence>
          <xsd:element name="If" minOccurs="0" maxOccurs="1">
            <xsd:complexType>
              <xsd:choice>
                <xsd:element name="UserDefinedCondition" type="tns:MyIDREF"/>
                <xsd:group ref="tns:BuiltInConditions"/>
                <xsd:group ref="tns:BooleanExpressions"/>
              </xsd:choice>
            </xsd:complexType>
```

SpamAndSafetyRules_v1
```
            </xsd:element>
            <xsd:element name="Execute">
              <xsd:complexType>
                <xsd:sequence>
                  <xsd:group ref="Actions" minOccurs="1" maxOccurs="unbounded"/>
                </xsd:sequence>
              </xsd:complexType>
            </xsd:element>
          </xsd:sequence>
          <xsd:attribute name="name" type="xsd:string"/>
          <xsd:attribute name="applyIf" type="tns:ApplyIfType" default="Always"/>
        </xsd:complexType>
      </xsd:element>
    </xsd:sequence>
    <!-- This attribute is used to indicate whether the Rules should be executed
         one after another (as a list) or in an if-else manner -->
    <xsd:attribute name="execution" type="tns:RuleSetExecutionType"/>
    <xsd:attribute name="name" type="xsd:string"/>
  </xsd:complexType>

<xsd:complexType name="RuleSetGroup">
    <xsd:sequence>
      <xsd:element name="RuleSet" type="tns:RuleSet" minOccurs="1"
maxOccurs="unbounded"/>
    </xsd:sequence>
  </xsd:complexType>

<xsd:complexType name="RuleSets">
    <xsd:sequence>
      <xsd:element name="SafetyLevelRules" type="tns:RuleSetGroup"/>
      <xsd:element name="SafetyActionRules" type="tns:RuleSetGroup"/>
    </xsd:sequence>
  </xsd:complexType>

<xsd:element name="RuleSets" type="tns:RuleSets"/>

</xsd:schema>
```

In closing, a number of features were described herein by first identifying illustrative problems that these features can address. This manner of explication does not constitute an admission that others have appreciated and/or articulated the problems in the manner specified herein. Appreciation and articulation of the problems present in the relevant art(s) is to be understood as part of the present invention.

More generally, although the invention has been described in language specific to structural features and/or methodological acts, it is to be understood that the invention defined in the appended claims is not necessarily limited to the specific features or acts described. Rather, the specific features and acts are disclosed as illustrative forms of implementing the claimed invention.

What is claimed is:

1. A method for updating engine logic, comprising:
    forming engine logic at a service, wherein the engine logic is expressed in a description language; and
    providing the engine logic to a user device, wherein the engine logic governs a manner of operation of an engine module used by the user device.

2. The method of claim 1, wherein the description language is a markup language.

3. The method of claim 2, wherein the markup language is an extensible markup language (XML).

4. The method of claim 1, wherein the engine logic comprises at least one rule set, wherein said at least one rule set comprises a plurality of rules.

5. The method of claim 4, wherein each rule includes a condition portion and an executable portion, wherein the condition portion describes a condition that defines whether the rule is applicable, and wherein the executable portion describes at least one action to be performed if the rule is applicable.

6. The method of claim 5, wherein the condition portion expresses the condition using at least one Boolean operator.

7. The method of claim 4, wherein the engine executes the rules in said at least one rule set in a list mode of operation by executing all of the rules in the rule set.

8. The method of claim 4, wherein the engine executes the rules in said at least one rule set in an IF-ELSE mode by terminating the execution of the rules upon encountering a rule that is applicable.

9. The method of claim 4 wherein said at least one rule set includes at least one user-defined condition identified by a label, wherein at least one rule in said at least one rule set makes reference to said at least one user-defined condition using the label.

10. The method of claim 1, wherein the engine module is operable for controlling the user device's processing of incoming electronic messages.

11. One or more computing devices, comprising:
    one or more processors; and
    memory to store computer-executable instructions that, when executed by the one or more processors, perform the method of claim 1.

12. One or more machine-readable media containing machine-readable instructions for implementing the method of claim 1.

13. An engine for use by an electronic user device, comprising:
    an engine update module configured to:
        receive engine logic from a service, wherein the engine logic is expressed in a description language; and
        update an engine parse tree based on the engine logic; and
    an engine module configured to process events using the parse tree.

14. The engine of claim 13, wherein the description language is a markup language.

15. The engine of claim 14, wherein the markup language is an extensible markup language (XML).

16. The engine of claim 13, wherein the engine logic comprises at least one rule set, wherein said at least one rule set comprises a plurality of rules.

17. The engine of claim 16, wherein each rule includes a condition portion and an executable portion, wherein the condition portion describes a condition that defines whether the rule is applicable, and wherein the executable portion describes at least one action to be performed if the rule is applicable.

18. The engine of claim 13, wherein the engine module is operable for controlling the user device's processing of incoming electronic messages.

19. A data structure stored by one or more machine-readable media, the data structure comprising:
    at least one rule set, wherein said at least one rule set comprises a plurality of rules; and
    wherein each rule includes a condition portion and an executable portion, wherein the condition portion describes a condition that defines whether the rule is applicable, and wherein the executable portion describes at least one action to be performed if the rule is applicable.

20. The data structure of claim 19, the condition portion expresses the condition using conditional elements selected from:
    a built-in condition, wherein the built-in condition defines a condition expressed in a schema associated with said at least one rule set;
    a user-defined condition, wherein the user-defined condition defines a condition constructed using one or more built-in conditions; and
    a Boolean condition.

* * * * *

UNITED STATES PATENT AND TRADEMARK OFFICE
CERTIFICATE OF CORRECTION

| | |
|---|---|
| PATENT NO. | : 7,792,780 B2 |
| APPLICATION NO. | : 11/846258 |
| DATED | : September 7, 2010 |
| INVENTOR(S) | : Long Zhou et al. |

It is certified that error appears in the above-identified patent and that said Letters Patent is hereby corrected as shown below:

In column 33, line 47, in Claim 9, delete "claim 4" and insert -- claim 4, --, therefor.

Signed and Sealed this
Second Day of August, 2011

David J. Kappos
*Director of the United States Patent and Trademark Office*